(12) United States Patent     (10) Patent No.:   US 12,573,901 B2

Jee et al.     (45) Date of Patent:    Mar. 10, 2026

(54) ROTOR FOR USE WITH AN ELECTRIC SUBMERSIBLE PUMP

(71) Applicant: Schlumberger Technology Corporation, Sugar Land, TX (US)

(72) Inventors: You Cheng Jee, Singapore (SG); Raju Ekambaram, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/589,990

(22) Filed: Feb. 28, 2024

(65) Prior Publication Data

US 2024/0291333 A1    Aug. 29, 2024

(30) Foreign Application Priority Data

Feb. 28, 2023   (SG) ............................ 10202300526Y

(51) Int. Cl.
| | |
|---|---|
| *H02K 1/278* | (2022.01) |
| *H02K 15/03* | (2006.01) |
| *H02K 17/02* | (2006.01) |

(52) U.S. Cl.
CPC ............. *H02K 1/278* (2013.01); *H02K 15/03* (2013.01); *H02K 17/02* (2013.01)

(58) Field of Classification Search
CPC .......... H02K 1/278; H02K 1/28; H02K 15/03; H02K 17/02; F04B 47/06; F04B 17/03; F04D 13/06; F04D 13/08; F04D 13/10
See application file for complete search history.

(56) References Cited

U.S. PATENT DOCUMENTS

| | | | |
|---|---|---|---|
| 8,716,915 B2 | 5/2014 | Radov et al. | |
| 8,723,383 B2 | 5/2014 | Blanc et al. | |
| 2014/0028119 A1 | 1/2014 | Sagalovskiiy et al. | |
| 2016/0294268 A1 * | 10/2016 | Head ..................... | H02K 21/14 |

FOREIGN PATENT DOCUMENTS

| | | | | |
|---|---|---|---|---|
| CN | 107579615 A | 1/2018 | | |
| CN | 210041467 U * | 2/2020 | ............... | H02K 1/27 |
| WO | WO-2016003309 A1 * | 1/2016 | ............. | F04B 17/03 |

OTHER PUBLICATIONS

Search Report and Written Opinion of International Patent Application No. PCT/US2024/017629 Dated, Feb. 28, 2024, 9 Pages.

\* cited by examiner

*Primary Examiner* — Loren C Edwards

(74) *Attorney, Agent, or Firm* — Jeffrey D. Frantz

(57)       ABSTRACT

A rotor for use with an electric submersible pump. The rotor may comprise a yoke having a plurality of steps formed in an outer surface of the yoke. The rotor may comprise a plurality of spacers positioned about the yoke, each spacer of the plurality of spacers positioned at a location of a respective step to prevent relative rotation between the plurality of spacers and the yoke. The rotor may comprise a plurality of permanent magnets positioned about the yoke and separated from each other via a respective spacer of the plurality of spacers, the plurality of permanent magnets prevented from rotating relative to the yoke via the plurality of spacers. The rotor may comprise an enclosure surrounding the plurality of spacers and the plurality of permanent magnets.

20 Claims, 4 Drawing Sheets

414

404

402

400

408

406

ROTOR FOR USE WITH AN ELECTRIC SUBMERSIBLE PUMP

CROSS REFERENCE TO RELATED APPLICATIONS

This application claims the benefit of Singapore Provisional Application No. 10202300526Y filed Feb. 28, 2023, the entire contents of which are herein incorporated by reference in their entirety.

BACKGROUND

Various types of artificial lift equipment and methods are available, for example, electric submersible pumps (ESPs). An ESP includes multiple centrifugal pump stages mounted in series, each stage including a rotating impeller and a stationary diffuser mounted on a shaft, which is coupled to a motor. In use, the motor rotates the shaft, which in turn rotates the impellers within the diffusers. Well fluid flows into the lowest stage and passes through the first impeller, which centrifuges the fluid radially outward such that the fluid gains energy in the form of velocity. Upon exiting the impeller, the fluid flows into the associated diffuser, where fluid velocity is converted to pressure. As the fluid moves through the pump stages, the fluid incrementally gains pressure until the fluid has sufficient energy to travel to the well surface.

BRIEF DESCRIPTION OF THE FIGURES

Certain embodiments, features, aspects, and advantages of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood that the accompanying figures illustrate the various implementations described herein and are not meant to limit the scope of various technologies described herein.

DETAILED DESCRIPTION

Figure 1:
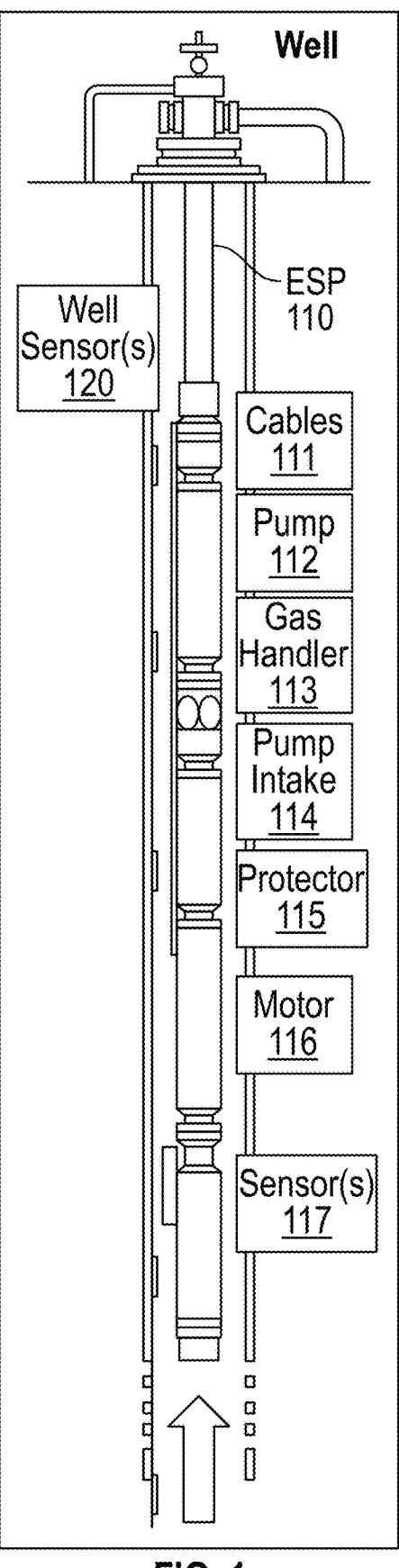
FIG. 1 is a schematic view of an electric submersible pump (ESP) system according to an embodiment of the disclosure.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

Various types of artificial lift equipment and methods are available, for example, electric submersible pumps (ESP). As shown in the example embodiment of FIG. 1, an ESP 110 typically includes a motor 116, a protector 115, a pump 112, a pump intake 114, and one or more cables 111, which can include an electric power cable. The motor 116 can be powered and controlled by a surface power supply and controller, respectively, via the cables 111. In some configurations, the ESP 110 also includes gas handling features 113 and/or one or more sensors 117 (e.g., for temperature, pressure, current leakage, vibration, etc.). As shown, the well may include one or more well sensors 120.

Figure 2:
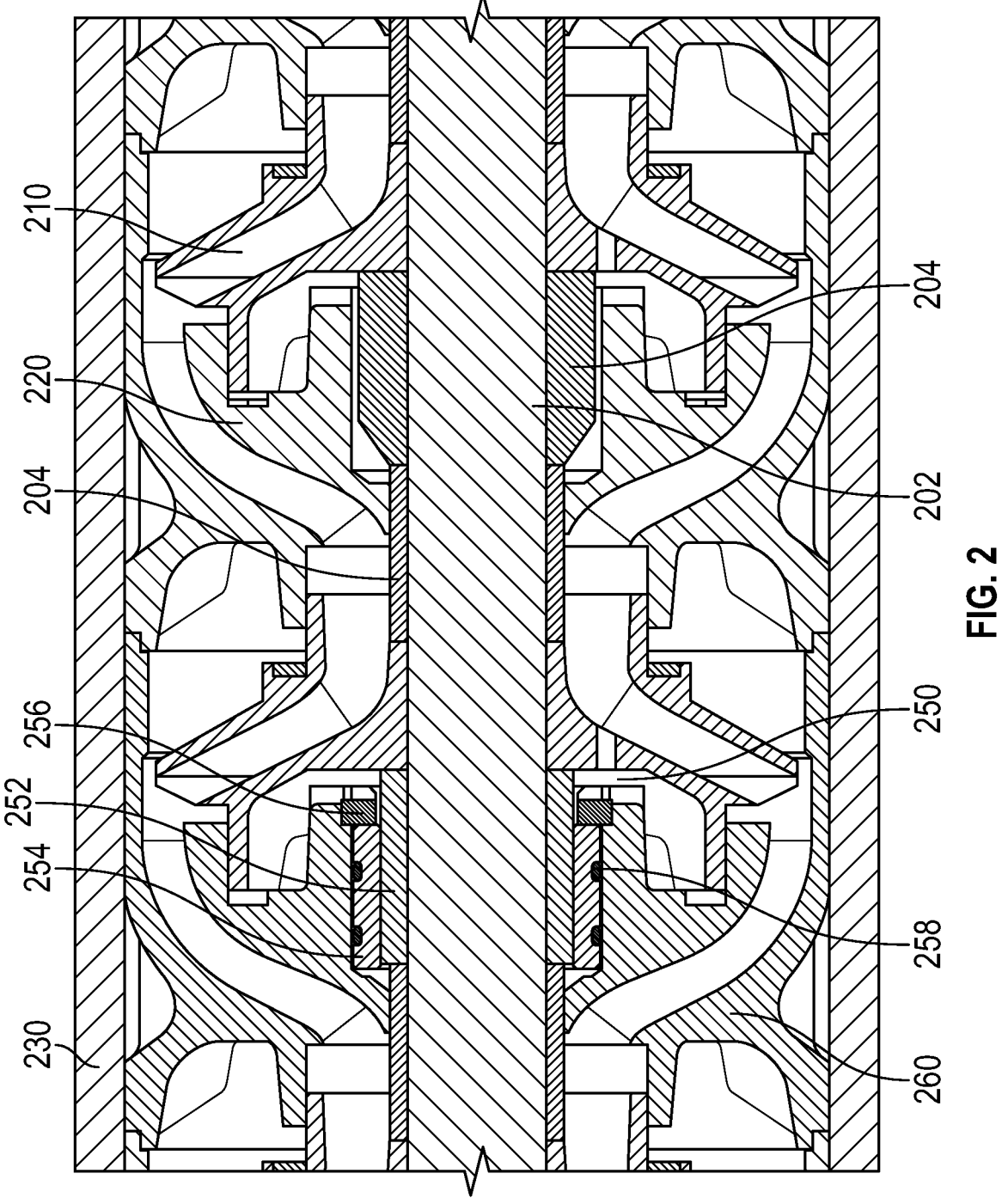
FIG. 2 is a cross-sectional view of the pump of the ESP of FIG. 1.

The pump 112 includes multiple centrifugal pump stages mounted in series within a housing 230, as shown in FIG. 2. Each stage includes a rotating impeller 210 and a stationary diffuser 220. One or more spacers 204 can be disposed axially between sequential impellers 210. A shaft 202 extends through the pump 112 (e.g., through central hubs or bores or the impellers 210 and diffusers 220) and is operatively coupled to the motor 116. The shaft 202 can be coupled to the protector 115 (e.g., a shaft of the protector), which in turn can be coupled to the motor 116 (e.g., a shaft of the motor). The impellers 210 are rotationally coupled, e.g., keyed, to the shaft 202. The diffusers 220 are coupled, e.g., rotationally fixed, to the housing 230. In use, the motor 116 causes rotation of the shaft 202 (for example, by rotating the protector 115 shaft, which rotates the pump shaft 202), which in turn rotates the impellers 210 relative to and within the stationary diffusers 220. The pump 112 may comprise an endplay gap 250, a bearing sleeve or shaft sleeve 252, a radial bearing or bushing 254, a lock ring and/or upthrust ring 256, a compliant mount elastomer ring or o-ring 258, and a bearing housing diffuser 260.

In use, well fluid flows into the first (lowest) stage of the ESP 110 and passes through an impeller 210, which centrifuges the fluid radially outward such that the fluid gains energy in the form of velocity. Upon exiting the impeller 210, the fluid makes a sharp turn to enter a diffuser 220, where the fluid's velocity is converted to pressure. The fluid then enters the next impeller 210 and diffuser 220 stage to repeat the process. As the fluid passes through the pump stages, the fluid incrementally gains pressure until the fluid has sufficient energy to travel to the well surface.

Figure 3:
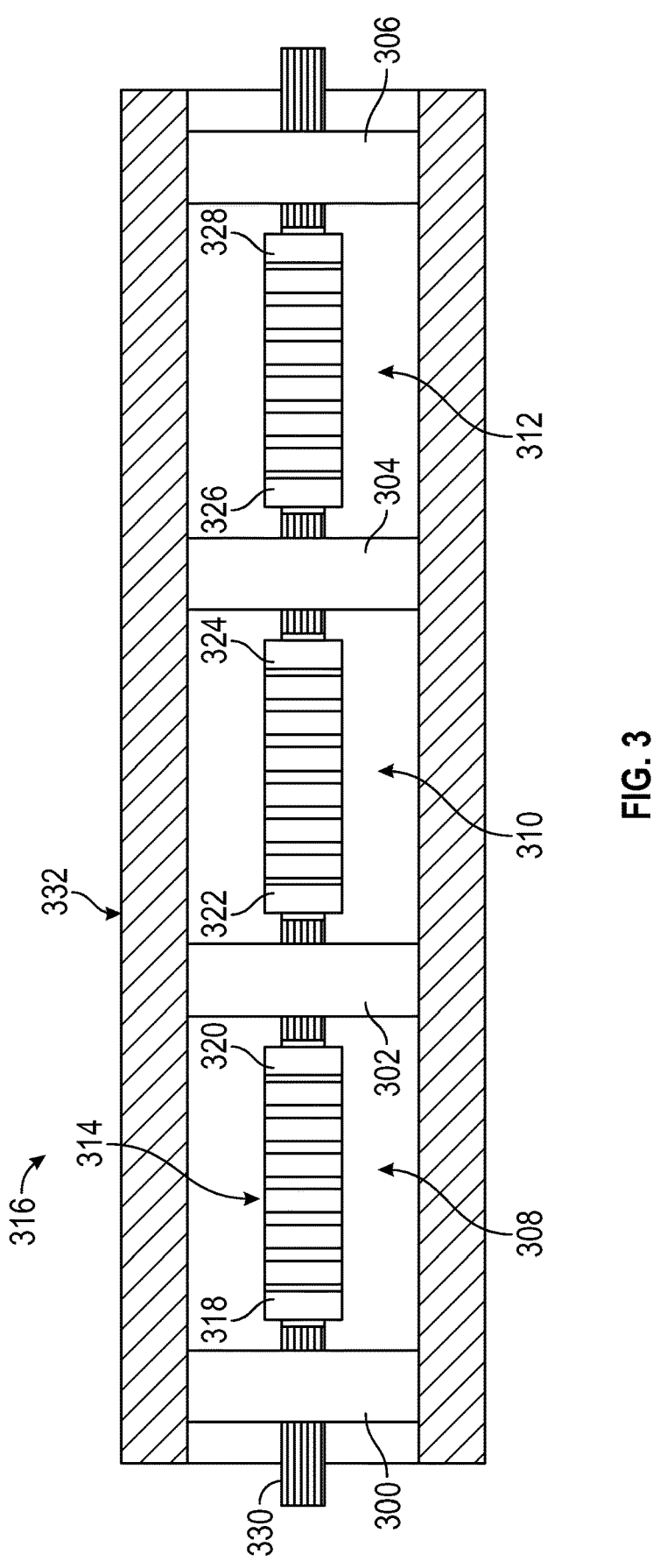
FIG. 3 is a schematic view of an induction motor according to an embodiment of the disclosure.

Turning now to FIG. 3, FIG. 3 is of an induction motor 316 according to an embodiment of the disclosure. In at least one embodiment, the induction motor 316 includes four radial bearings 300, 302, 304, 306 and three rotor segments 308, 310, 312 comprised of one or more individual rotors 314. The rotor segments 308, 310, 312 are arranged sequentially along their longitudinal axes. A radial bearing 302, 304 is provided between each pair of adjacent rotor segments 308, 310, 312, and a radial bearing 300, 306 is provided at each end of the longitudinally-arranged rotor segments 308, 310, 312. In other embodiments, one, two, four, or more rotor segments 308, 310, 312 and one, two, three, five, or more radial bearings 300, 302, 304, 306 may be used. On opposing ends of each rotor segment 308, 310, 312 are rotor end rings 318, 320, 322, 324, 326, 328. A shaft 330 is provided through the center of the rotor segments 308, 310, 312.

As shown in FIG. 3, the rotor segments 308, 310, 312 and radial bearings 300, 302, 304, 306 are contained within a generally cylindrical stator 332. Alternating magnetic fields in the stator 332 cause the rotor segments 308, 310, 312 to turn, which also causes the shaft 330 to turn. The speed at which the shaft 330 turns is referred to as the rotor shaft speed, shaft speed, and/or motor speed. Shaft speed may be expressed in units of revolutions per unit of time (e.g., revolutions per second).

Figure 4:
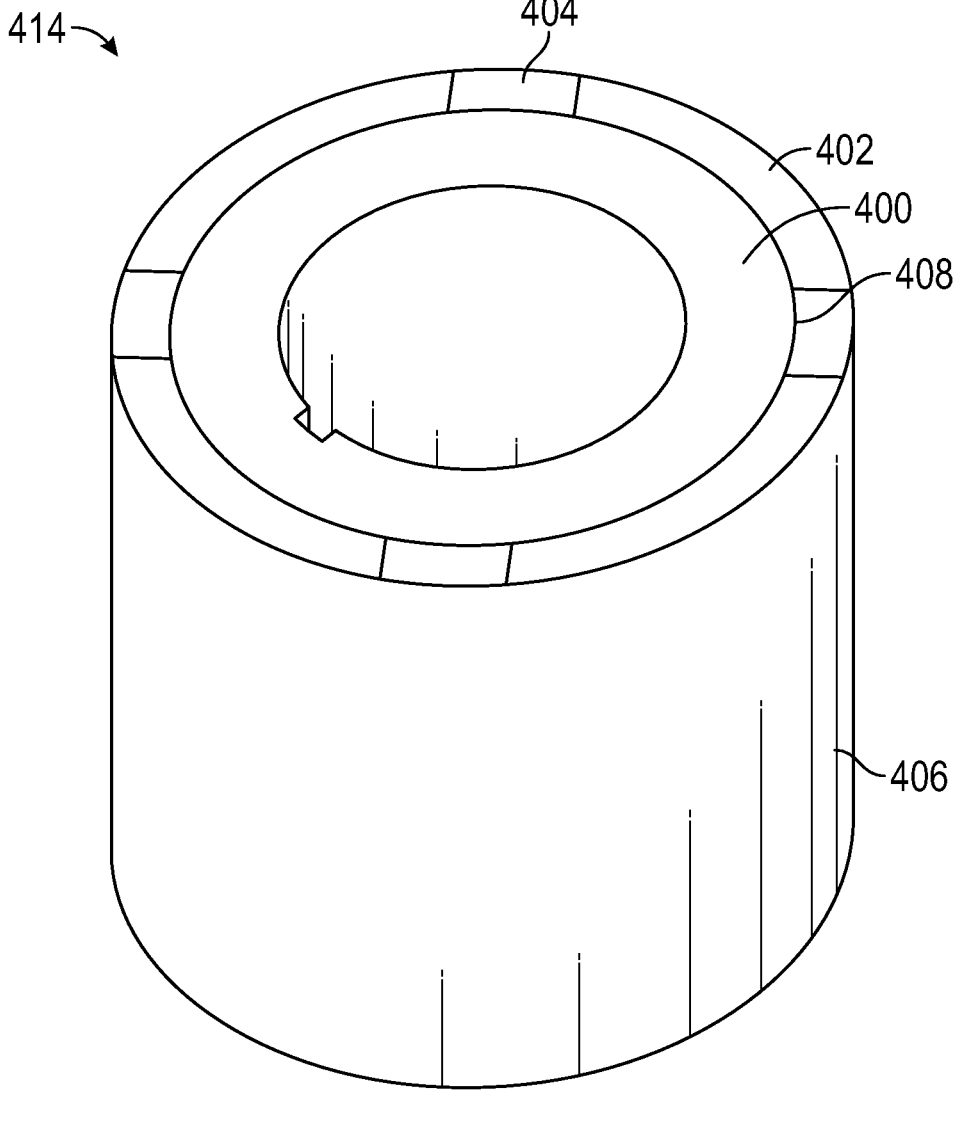
FIG. 4 is an isometric view of a rotor of an induction motor according to an embodiment of the disclosure.

Turning now to FIG. 4, FIG. 4 is a rotor 414 for an induction motor according to an embodiment of the disclosure. As discuss above the rotor is coupled to the shaft via a yoke 400 and turns the shaft via an alternating magnetic field from the stator. Specifically, the rotor includes multiple permanent magnets 402 positioned about the yoke 400 and separated by non-magnetic spacers 404. Both the permanent magnets 402 and the pole spacers 404 are surrounded by an enclosure 406. As the magnetic fields of the stator alternate, the permanent magnets 402 are rotated within the stator, thus rotating the shaft.

In one or more embodiments, the yoke includes small steps 408 formed in the outer surface of the yoke 400. As shown in FIG. 4, the spacers 404 are positioned about yoke 400 at the location of the steps 408. This configuration allows the steps 408 in the yoke 400 to lock the spacers 404 in place and prevent relative rotation between the yoke 400 and the spacers 404. By locking the spacers 404 in place, the permanent magnets 402 are also locked in place and prevented from rotating relative to the yoke 400.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A rotor for use with an electric submersible pump, the rotor comprising:
    a yoke having:
        a first end defined by a first surface;
        a second end defined by a second surface, the second end opposite the first end; and
        an outer surface including a plurality of steps formed in the outer surface;
    a plurality of spacers positioned about the yoke, each spacer of the plurality of spacers positioned at a location of a respective step to prevent relative rotation between the plurality of spacers and the yoke;
    a plurality of permanent magnets positioned about the yoke, wherein each permanent magnet of the plurality of permanent magnets is separated from another permanent magnet of the plurality of permanent magnets via a respective spacer of the plurality of spacers, the plurality of permanent magnets are prevented from rotating relative to the yoke via the plurality of spacers, each permanent magnet of the plurality of permanent magnets including:
        a first end defined by a first surface; and
        a second end opposite the first end defined by a second surface, wherein the first surface of each permanent magnet of the plurality of permanent magnets is coplanar with the first surface of the yoke and the second surface of each permanent magnet of the plurality of permanent magnets is coplanar with the second surface of the yoke; and
    an enclosure surrounding the plurality of spacers and the plurality of permanent magnets, wherein the enclosure extends from the first surface of the yoke to the second surface of the yoke.

2. The rotor of claim 1, wherein the rotor is coupled to a shaft via the yoke.

3. The rotor of claim 1, wherein each spacer of the plurality of spacers is non-magnetic.

4. The rotor of claim 1, wherein each spacer of the plurality of spacers is a pole spacer.

5. The rotor of claim 1, wherein each spacer of the plurality of spacers is configured to be locked in place by the respective step.

6. The rotor of claim 1, wherein the rotor is configured such that as magnetic fields of a stator alternate, the plurality of permanent magnets is rotated within the stator.

7. The rotor of claim 1, wherein the plurality of permanent magnets is configured to lock in place due to the plurality of spacers locking in place.

8. A method of operating an electric submersible pump (ESP), the method comprising:
    positioning the ESP within a well, wherein the ESP comprises a motor, the motor comprising a rotor and a stator; and rotating the rotor of the motor of the ESP via the stator of the motor, the rotor comprising:

a yoke having a first end defined by a first surface, a second end defined by a second surface, wherein the second end is opposite the first end, and an outer surface including a plurality of steps formed in the outer surface;

a plurality of spacers positioned about the yoke, each spacer of the plurality of spacers positioned at a location of a respective step to prevent relative rotation of the plurality of spacers and the yoke;

a plurality of permanent magnets positioned about the yoke, wherein each permanent magnet of the plurality of permanent magnets is separated from another permanent magnet of the plurality of permanent magnets via a respective spacer of the plurality of spacers, the plurality of permanent magnets are prevented from rotating relative to the yoke via the plurality of spacers, each permanent magnet of the plurality of permanent magnets including:

a first end defined by a first surface;

and a second end opposite the first end defined by a second surface, wherein the first surface of each permanent magnet of the plurality of permanent magnets is coplanar with the first surface of the yoke and the second surface of each permanent magnet of the plurality of permanent magnets is coplanar with the second surface of the yoke; and an enclosure surrounding the plurality of spacers and the plurality of permanent magnets, wherein the enclosure extends from the first surface of the yoke to the second surface of the yoke.

9. The method of claim 8, wherein the rotor is coupled to a shaft via the yoke.

10. The method of claim 8, wherein each spacer of the plurality of spacers is non-magnetic.

11. The method of claim 8, wherein each spacer of the plurality of spacers is a pole spacer.

12. The method of claim 8, wherein each spacer of the plurality of spacers is configured to be locked in place by the respective step.

13. The method of claim 8, further comprising alternating magnetic fields of the stator such that the plurality of permanent magnets is rotated within the stator.

14. The method of claim 8, wherein the rotor is part of an induction motor.

15. The method of claim 8, wherein the plurality of permanent magnets is configured to lock in place due to the plurality of spacers locking in place.

16. The method of claim 8, wherein the motor includes a plurality of rotor segments separated by radial bearings, wherein each rotor segment of the plurality of rotor segments includes:

a first rotor end ring;

a second rotor end ring; and a plurality of rotors disposed between the first rotor end ring and the second rotor end ring, wherein the plurality of rotors of each rotor segment of the plurality of rotor segments are axially aligned.

17. A method of manufacturing a rotor, the method comprising:

positioning a yoke having a plurality of steps in an outer surface of the rotor, wherein the yoke includes a first end defined by a first surface and a second end opposite the first end defined by a second surface;

positioning a plurality of spacers about the yoke, each spacer of the plurality of spacers being positioned at a location of a respective step to prevent relative rotation between the plurality of spacers and the yoke;

positioning a plurality of permanent magnets about the yoke, wherein each permanent magnet of the plurality of permanent magnets is separated from another permanent magnet of the plurality of permanent magnets via a respective spacer of the plurality of spacers, wherein the plurality of permanent magnets are prevented from rotating relative to the yoke via the plurality of spacers, and wherein each permanent magnet of the plurality of permanent magnets includes a first end defined by a first surface and a second end opposite the first end defined by a second surface, and wherein the first surface of each permanent magnet of the plurality of permanent magnets is coplanar with the first surface of the yoke and the second surface of each permanent magnet of the plurality of permanent magnets is coplanar with the second surface of the yoke; and surrounding the plurality of spacers and the plurality of permanent magnets with an enclosure, wherein the enclosure extends from the first surface of the yoke to the second surface of the yoke.

18. The method of claim 17, further comprising coupling the rotor to a shaft via the yoke.

19. The method of claim 17, wherein each spacer of the plurality of spacers is non-magnetic.

20. The method of claim 17, wherein each spacer of the plurality of spacers is a pole spacer.

* * * * *